(12) United States Patent
Rodriguez Bravo

(10) Patent No.: US 12,489,762 B2
(45) Date of Patent: Dec. 2, 2025

(54) BOT DETECTION IN A VIRTUAL DIGITAL ENVIRONMENT

(71) Applicant: Kyndryl, Inc., New York, NY (US)

(72) Inventor: Cesar Rodriguez Bravo, Alajuela (CR)

(73) Assignee: Kyndryl, Inc., New York, NY (US)

( * ) Notice: Subject to any disclaimer, the term of this patent is extended or adjusted under 35 U.S.C. 154(b) by 297 days.

(21) Appl. No.: 18/180,259

(22) Filed: Mar. 8, 2023

(65) Prior Publication Data
US 2024/0305647 A1     Sep. 12, 2024

(51) Int. Cl.
*H04L 9/40*     (2022.01)

(52) U.S. Cl.
CPC ........ *H04L 63/1416* (2013.01); *H04L 63/145* (2013.01)

(58) Field of Classification Search
CPC .................................................. H04L 63/1416
See application file for complete search history.

(56) References Cited

U.S. PATENT DOCUMENTS

| | | |
|---|---|---|
| 6,339,832 B1 | 1/2002 | Bowman-Amuah |
| 6,434,568 B1 | 8/2002 | Bowman-Amuah |
| 6,477,580 B1 | 11/2002 | Bowman-Amuah |
| 6,477,665 B1 | 11/2002 | Bowman-Amuah |
| 6,502,213 B1 | 12/2002 | Bowman-Amuah |
| 6,549,949 B1 | 4/2003 | Bowman-Amuah |
| 6,578,068 B1 | 6/2003 | Bowman-Amuah |
| 6,640,244 B1 | 10/2003 | Bowman-Amuah |
| 6,640,249 B1 | 10/2003 | Bowman-Amuah |
| 6,715,145 B1 | 3/2004 | Bowman-Amuah |
| 6,742,015 B1 | 5/2004 | Bowman-Amuah |
| 7,289,964 B1 | 10/2007 | Bowman-Amuah |
| 7,899,915 B2 | 3/2011 | Reisman |
| 8,543,930 B2 | 9/2013 | Champion et al. |

(Continued)

FOREIGN PATENT DOCUMENTS

| | | |
|---|---|---|
| CN | 107409126 A | 11/2017 |
| DE | 112020000054 T5 | 3/2021 |

(Continued)

OTHER PUBLICATIONS

"Game Bot Detection via Avatar Trajectory Analysis", Hsing-Kuo Pao, IEEE Transactions on Computational Intelligence and AI in Games, vol. 2, No. 3, Sep. 2010 (Year: 2010).*

(Continued)

*Primary Examiner* — Simon P Kanaan
(74) *Attorney, Agent, or Firm* — CANTOR COLBURN LLP; Erik Swanson

(57) ABSTRACT

Disclosed embodiments provide bot detection in a virtual environment that is based on avatar motion. The motion of an avatar within a virtual environment such as a metaverse is tracked. The tracked motion is separated into multiple movement segments. The movement segments are compared to a collection of movement patterns in a movement pattern database that are indicative of bots. A similarity metric is determined between the tracked motion and the database of bot motions. In response to the similarity metric exceeding a predetermined threshold, a list of at least one mitigation action is obtained, and the at least one mitigation action in the list is executed, thereby mitigating the adverse effects of bots in a virtual digital environment.

19 Claims, 10 Drawing Sheets

(56) References Cited

U.S. PATENT DOCUMENTS

| | | |
|---|---|---|
| 9,197,736 B2 | 11/2015 | Davis et al. |
| 10,904,261 B2 | 1/2021 | Atanda |
| 11,443,059 B2 | 9/2022 | Falchuk et al. |
| 11,457,031 B1 | 9/2022 | Bisht et al. |
| 11,463,462 B2 | 10/2022 | Luo et al. |
| 11,475,374 B2 | 10/2022 | Polleri et al. |
| 11,727,123 B2 * | 8/2023 | Nelson ............... G06F 21/6218 726/28 |
| 2003/0058277 A1 | 3/2003 | Bowman-Amuah |
| 2012/0050286 A1 * | 3/2012 | Yockey ............... A63F 13/55 345/420 |
| 2012/0185942 A1 | 7/2012 | Dixon et al. |
| 2013/0067573 A1 | 3/2013 | Champion et al. |
| 2013/0073387 A1 | 3/2013 | Heath |
| 2014/0331119 A1 | 11/2014 | Dixon et al. |
| 2015/0310196 A1 | 10/2015 | Turgeman et al. |
| 2016/0044054 A1 | 2/2016 | Stiansen et al. |
| 2017/0147775 A1 | 5/2017 | Ohnemus et al. |
| 2018/0167402 A1 | 6/2018 | Scheidler et al. |
| 2019/0036858 A1 | 1/2019 | Kovega et al. |
| 2019/0253504 A1 | 8/2019 | Wang et al. |
| 2019/0370492 A1 | 12/2019 | Falchuk et al. |
| 2019/0394242 A1 | 12/2019 | Wig et al. |
| 2020/0067861 A1 | 2/2020 | Leddy et al. |
| 2020/0068035 A1 | 2/2020 | Wang et al. |
| 2020/0104337 A1 | 4/2020 | Kelly et al. |
| 2020/0302263 A1 | 9/2020 | Douek |
| 2020/0334095 A1 | 10/2020 | Xu et al. |
| 2021/0026984 A1 | 1/2021 | Dotan-Cohen et al. |
| 2021/0065294 A1 | 3/2021 | Trevathan et al. |
| 2022/0116736 A1 | 4/2022 | Williams et al. |
| 2022/0121884 A1 | 4/2022 | Zadeh et al. |
| 2022/0131895 A1 | 4/2022 | Ho |
| 2022/0138753 A1 | 5/2022 | Wright et al. |
| 2022/0164643 A1 | 5/2022 | Charnock et al. |
| 2022/0210033 A1 | 6/2022 | Higgins et al. |
| 2022/0210200 A1 | 6/2022 | Crabtree et al. |
| 2022/0232080 A1 | 7/2022 | Sathianarayanan et al. |
| 2022/0329622 A1 | 10/2022 | Senecal et al. |

FOREIGN PATENT DOCUMENTS

| | | |
|---|---|---|
| JP | 2020203075 A | 12/2020 |
| KR | 20180105688 A | 9/2018 |
| WO | 2001016704 A2 | 3/2001 |
| WO | 2001016723 A2 | 3/2001 |
| WO | 2001016727 A2 | 3/2001 |
| WO | 2001016728 A2 | 3/2001 |
| WO | 2001017195 A2 | 3/2001 |
| WO | 2003065173 A9 | 11/2004 |
| WO | 2014160296 A1 | 10/2014 |
| WO | 2016156513 A1 | 10/2016 |
| WO | 2016177437 A1 | 11/2016 |
| WO | 2019113308 A1 | 6/2019 |
| WO | 2020163508 A1 | 8/2020 |
| WO | 2021030288 A1 | 2/2021 |
| WO | 2022133330 A1 | 6/2022 |

OTHER PUBLICATIONS

Eunjo Lee et al., "You Are a Game Bot!: Uncovering Game Bots in MMORPGs via Self-similarity in the Wild", Department of Computer Science, UCF, NDSS, 2016, 15 pages.

IPCOM000253535D, "Bot prevention method using panoramic media", Apr. 9, 2018, 3 pages.

IPCOM000270636D, "Metaverse Action Obfuscation", Jul. 25, 2022, 3 pages.

Salim, Sahim "Dubai Metaverse Assembly announced for September; to showcase 'real' meetings in virtual world", https://www.khaleejtimes.com/metaverse/dubai-metaverse-assembly-announced-for-september-to-showcase-real-meetings-in-virtual-world, Jul. 19, 2022, 6 pgs.

Sheperd, Jack, "20 Essential Meta Statistics You Need to Know in 2023", https://thesocialshepherd.com/blog/meta-statistics, Jan. 3, 2023, 19 pgs.

* cited by examiner

BOT DETECTION IN A VIRTUAL DIGITAL ENVIRONMENT

FIELD

The present invention relates generally to malware detection, and more particularly, to bot detection in a virtual digital environment.

BACKGROUND

A computer bot, also known simply as a 'bot,' is a software program designed to automate repetitive and simple tasks. Bots can be programmed to perform a variety of functions such as web scraping, data mining, online communication, and automation of simple processes. They can run on various platforms, such as websites, instant messaging apps, and social media platforms, and can interact with users in various ways. Bots can be used for both legitimate and malicious purposes.

Adverse effects of computer bots can include spread of misinformation and propaganda. Bots can be programmed to spread false information and manipulate public opinion on a massive scale. Similarly, bots can be used to manipulate prices in financial markets, causing disruptions and harm to investors. Additionally, bots can flood online forums and social media with spam, making it difficult for legitimate users to enjoy the services and benefits of the platform. Beyond that, bots can be used to carry out cyber-attacks such as hacking, phishing, and malware distribution. Additionally, unwanted bots can use a lot of computer and network resources that may impact the experience of other users and cause an increase in infrastructure costs. Thus, it is important to take the problems associated with bots seriously.

SUMMARY

In one embodiment, there is provided a computer-implemented method for bot detection, comprising: tracking motion of an avatar within a virtual environment; separating the tracked motion into a plurality of movement segments; comparing the plurality of movement segments to a collection of movement patterns; computing a similarity metric for the tracked motion to at least one movement pattern from the collection of movement patterns; in response to the similarity metric exceeding a predetermined threshold: obtaining a list of at least one mitigation action; and executing the at least one mitigation action from the list.

In another embodiment, there is provided an electronic computation device comprising: a processor; a memory coupled to the processor, the memory containing instructions, that when executed by the processor, cause the electronic computation device to: track motion of an avatar within a virtual environment; separate the tracked motion into a plurality of movement segments; compare the plurality of movement segments to a collection of movement patterns; compute a similarity metric for the tracked motion to at least one movement pattern from the collection of movement patterns; in response to the similarity metric exceeding a predetermined threshold: obtain a list of at least one mitigation action; and execute the at least one mitigation action from the list.

In yet another embodiment, there is provided a computer program product for an electronic computation device comprising a computer readable storage medium having program instructions embodied therewith, the program instructions executable by a processor to cause the electronic computation device to: track motion of an avatar within a virtual environment; separate the tracked motion into a plurality of movement segments; compare the plurality of movement segments to a collection of movement patterns; compute a similarity metric for the tracked motion to at least one movement pattern from the collection of movement patterns; in response to the similarity metric exceeding a predetermined threshold: obtain a list of at least one mitigation action; and execute the at least one mitigation action from the list.

Figure 1:
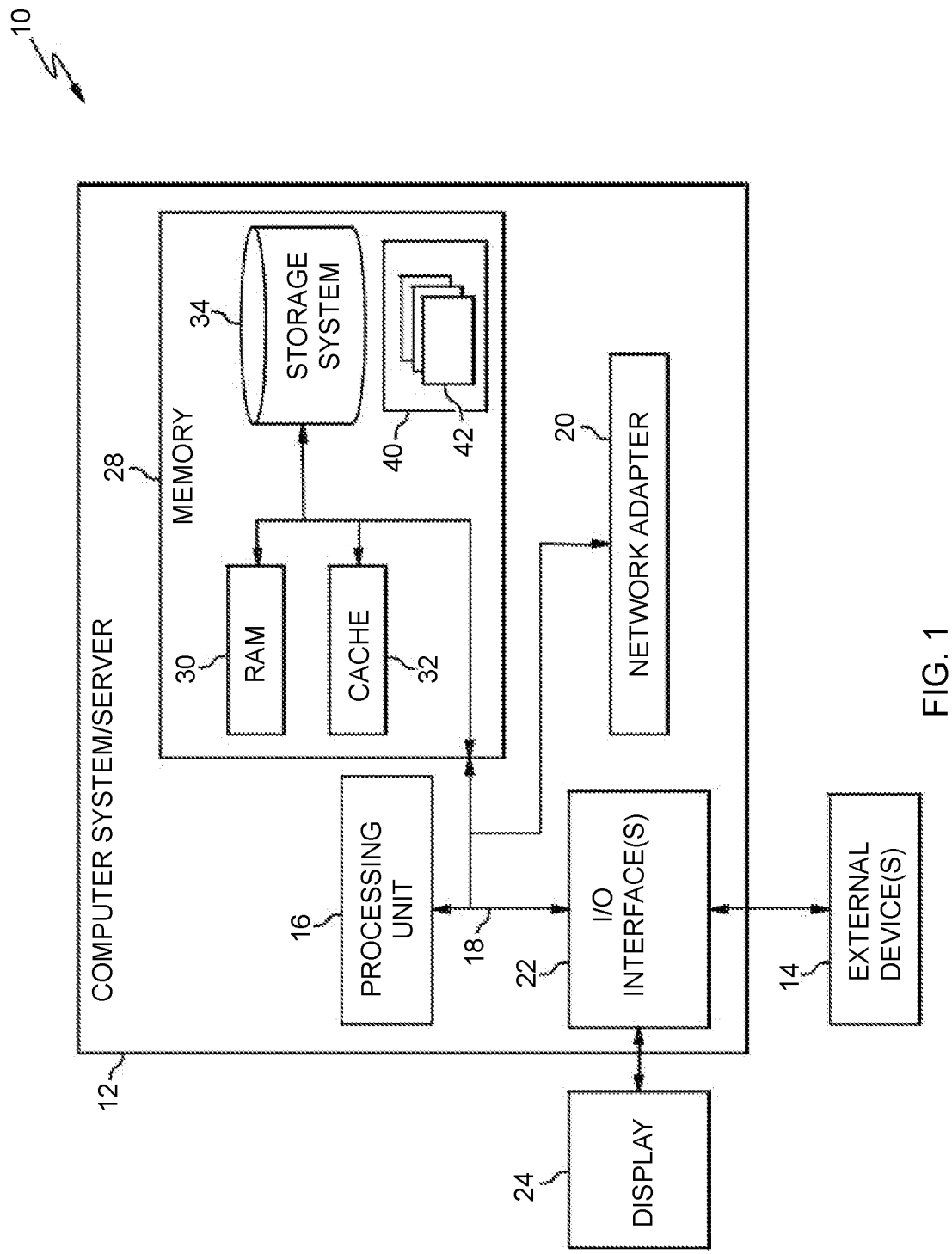
FIG. 1 depicts a cloud computing node according to an embodiment of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Virtual environments, such as virtual reality environments, can be used for gaming, entertainment, education, and more. Additionally, metaverses, which are virtual environments that can include immersive experiences beyond gaming are becoming more and more popular.

The term 'metaverse' generally refers to a virtual world or a collective space created by the convergence of virtual reality, augmented reality, and/or other forms of digital media. Metaverses can enable socialization that includes interacting with other users in virtual spaces, such as virtual clubs, events, and parties. Metaverses can also include rich gaming environments that allow users to play video games and/or to participate in virtual sports, races, and/or other competitive events. Metaverses can also have an ecommerce component, allowing the purchase of virtual goods, clothing, accessories, and other items to personalize an avatar and allow a user to show off his/her unique style. Additionally, there can be applications for education and/or work within a metaverse. As examples, within a metaverse, it is possible to participate in virtual education and training programs, attend virtual classes, attend virtual conferences and workshops, collaborate with colleagues, attend virtual meetings, and/or perform virtual tasks in a virtual workspace, among other things. With support for the aforementioned activities, it is important to detect and mitigate bot activity within a metaverse.

Disclosed embodiments provide bot detection in a virtual environment, such as a metaverse, that is based on avatar motion. The motion of an avatar within a virtual environment such as a metaverse is tracked. The tracked motion is separated into multiple movement segments. The movement segments are compared to a collection of movement patterns in a movement pattern database that are indicative of bots. A similarity metric is determined between the tracked motion and the database of bot movement patterns. In response to the similarity metric exceeding a predetermined threshold, a list of at least one mitigation action is obtained, and the at least one mitigation action in the list is executed, thereby mitigating the adverse effects of bots in a virtual digital environment.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

Computer system/server 12 typically includes a variety of computer system readable media. Such media may be any available media that is accessible by computer system/server 12, and it includes both volatile and non-volatile media, removable and non-removable media.

Program/utility 40, having a set (at least one) of program modules 42, may be stored in memory 28 by way of example (which can include cache 32, RAM 30, and storage system 34), and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
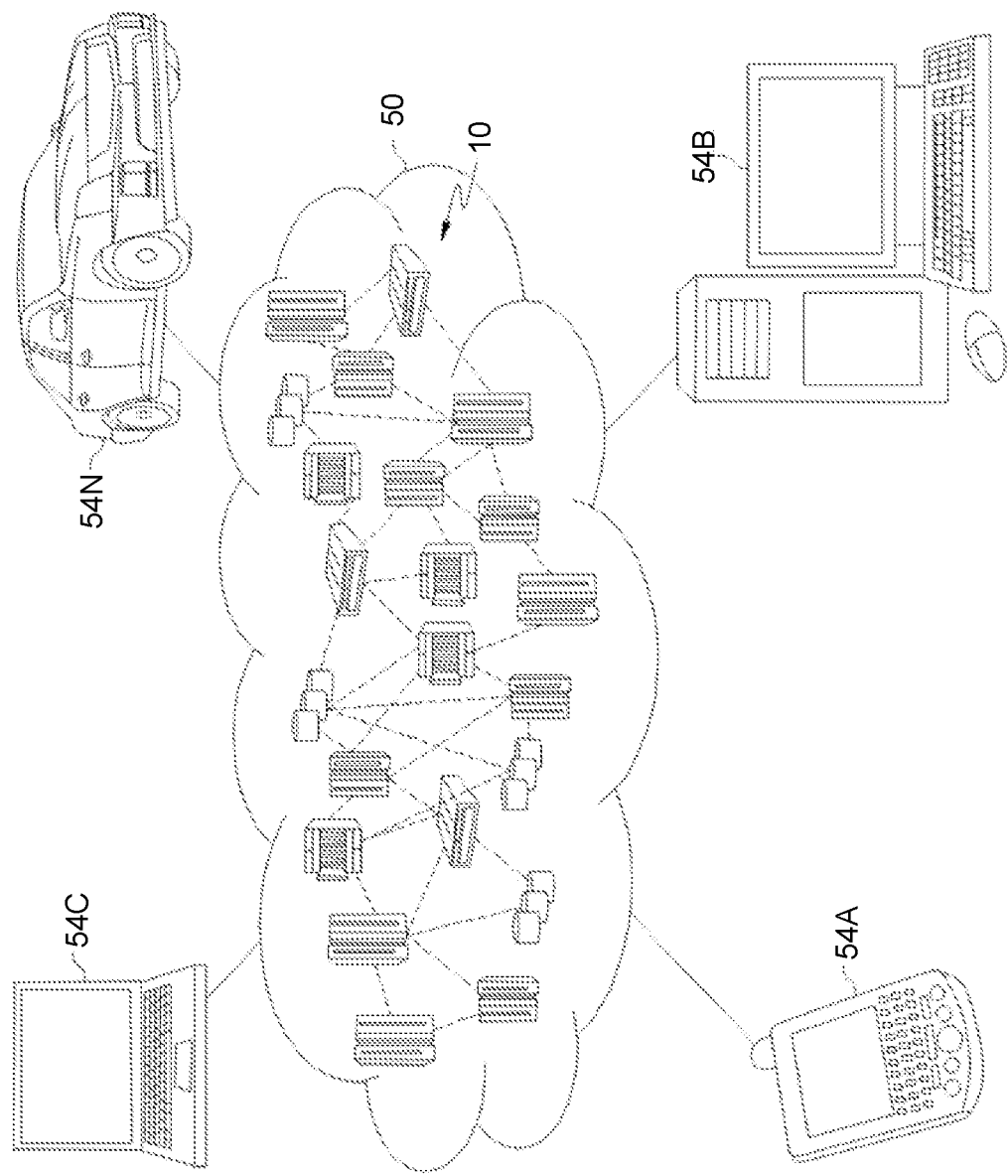
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
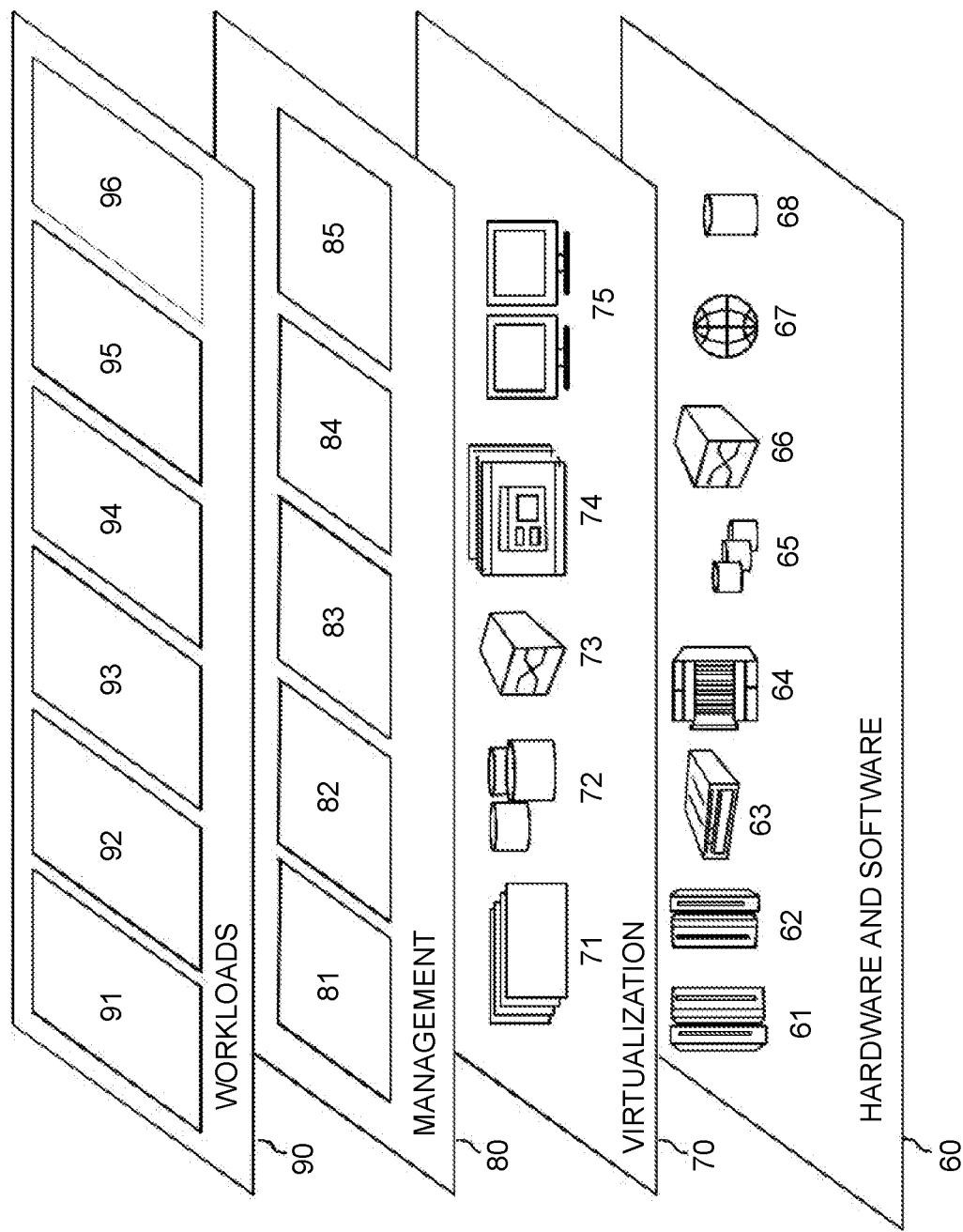
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual environment bot detection system 96.

Implementations of the invention may include a computer system/server 12 of FIG. 1 in which one or more of the program modules 42 are configured to perform (or cause the computer system/server 12 to perform) one or more functions of the virtual environment bot detection system 96 of FIG. 3. For example, the one or more of the program modules 42 may be configured to: track motion of an avatar within a virtual environment; separate the tracked motion into a plurality of movement segments; compare the plurality of movement segments to a collection of movement patterns; compute a similarity metric for the tracked motion to one or more movement patterns from the collection of movement patterns; in response to the similarity metric exceeding a predetermined threshold: obtain a list of one or more mitigation actions; and execute the one or more mitigation actions from the list.

Figure 4:
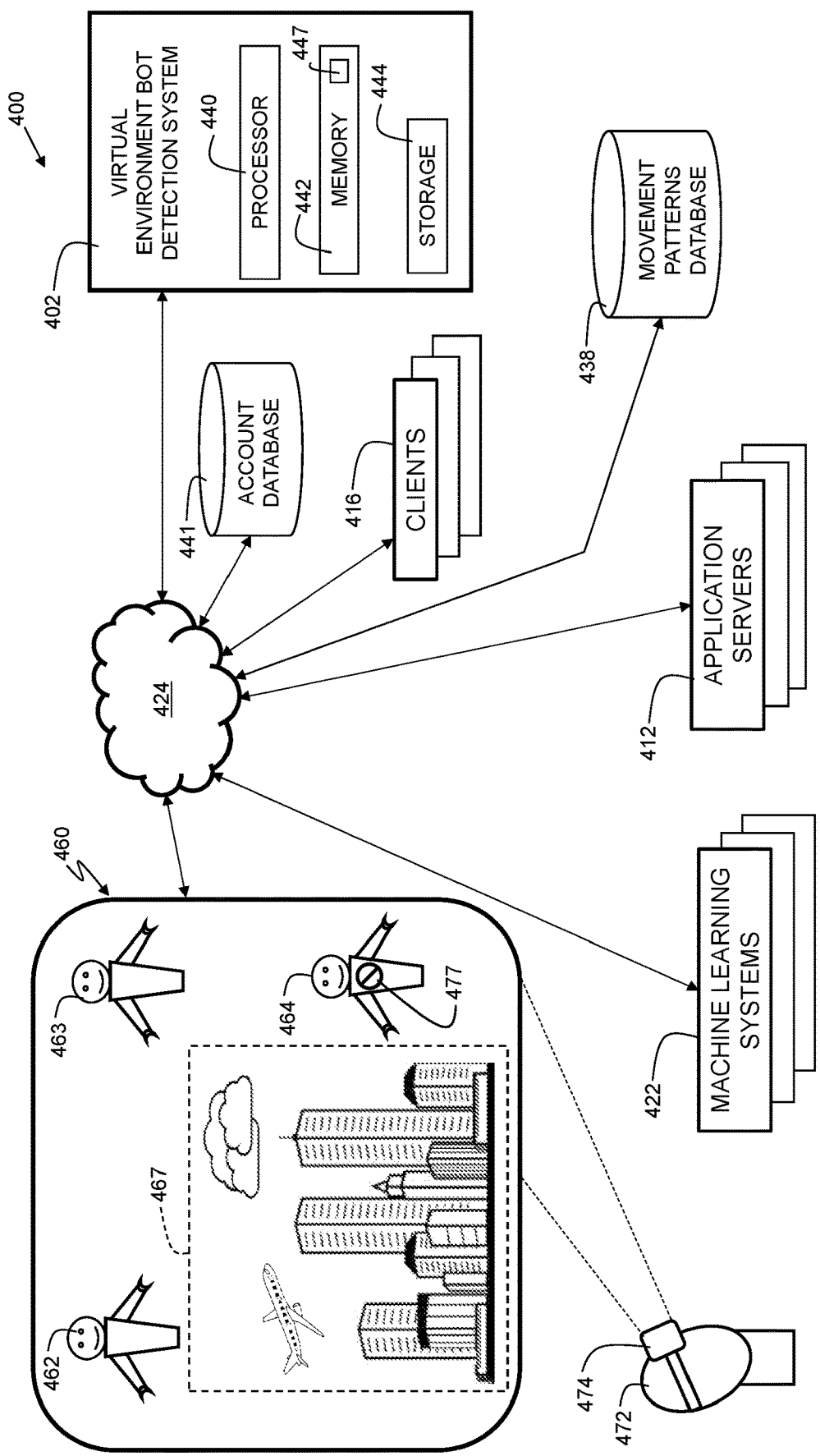
FIG. 4 is an ecosystem for embodiments of the present invention.

FIG. 4 is an ecosystem 400 for embodiments of the present invention. Virtual Environment Bot Detection System (VEBDS) 402 comprises a processor 440, a memory 442 coupled to the processor 440, and storage 444. System 402 is an electronic computation device. The memory 442 contains program instructions 447, that when executed by the processor 440, perform processes, techniques, and implementations of disclosed embodiments. Memory 442 can include dynamic random-access memory (DRAM), static random-access memory (SRAM), magnetic storage, and/or a read only memory such as flash, EEPROM, optical storage, or other suitable memory, and should not be construed as being a transitory signal per se. In some embodiments, storage 444 may include one or more magnetic storage devices such as hard disk drives (HDDs). Storage 444 may additionally include one or more solid state drives (SSDs). The VEBDS 402 is configured to interact with other elements of ecosystem 400. VEBDS 402 is connected to network 424, which can include the Internet, a wide area network, a local area network, and/or other suitable network.

Ecosystem 400 may include one or more client devices, indicated as 416. Client device 416 can include a laptop computer, desktop computer, tablet computer, smartphone, virtual reality headset, augmented reality goggles, wearable computing device, or other suitable computing device. Client device 416 may be used to participate in a virtual environment, and/or configure VEBDS 402.

Ecosystem 400 may include one or more machine learning systems 422. The machine learning systems 422 can include, but are not limited to, a convolutional neural network (CNN), Recurrent Neural Network (RNN), Long Short Term Memory Network (LSTM), Radial Basis Function Network (RBFN), Multilayer Perceptron (MLP), Gradient Boosted Network, and/or other suitable neural network types. In some embodiments, the VEBDS 402 may orchestrate training and inputting data and receiving of output data from the machine learning systems 422. In some embodiments, one or more of the aforementioned neural networks may be implemented with the VEBDS 402. The training data and output data from machine learning systems 422 can include avatar movement patterns. The avatar movement patterns can include movement patterns from confirmed bot avatars, and/or confirmed human-controlled avatars. The movement patterns can be stored in a movement patterns database 438. The movement patterns database can include an SQL database, or other suitable database type. The movement patterns may be encoded as a sequence of alphanumeric characters. The movement patterns can be used by the VEBDS 402 to flag possible bot avatars within a virtual environment such as a metaverse.

Ecosystem 400 may further include account database 441. The account database can include an SQL database, or other suitable database type. The account database can include information on user accounts, avatars, and/or other relevant data. The data can include an avatar status. In embodiments, the avatar status may be encoded as a word with various bit fields, where bits within the word convey information about the avatar. The information can include an active/inactive status, a verification status, indicating verified human user, verified bot, suspected bot, and so on. In embodiments, the VEBDS 402 can update the verification status of an avatar based on movement patterns, results of authentication challenges, and/or other information.

Ecosystem 400 may include one or more application servers 412. The application servers 412 may implement HTML-based user interfaces and provide backend functionality to support virtual environment and/or metaverse features and functions such as, gaming, virtual meetings, education, e-commerce, banking, and/or financial applications, to name a few.

Ecosystem 400 includes a virtual digital environment 460. The environment 460 can include a virtual reality environment, augmented reality environment, metaverse, and/or other suitable virtual digital environment. The virtual environment 460 includes multiple avatars, shown as 462, 463, and 464. These avatars are representations of users, and/or synthetic users that are computer controlled. In some embodiments, the avatars have a humanoid form, including legs, arms, torso, and a facial region. In other embodiments, the avatars can be of a simplified form. As an example, the avatars may have only a torso, arms, and a facial region, with the lower limbs being absent.

The synthetic users can be non-playable characters in a game, or bots that operate autonomously within the virtual environment. The virtual environment can include a rendering 467. The rendering 467 can include renderings of physical objects such as buildings, planes, clouds, cars, trees, and the like. Additionally, the rendering 467 can include objects that do not exist in reality. The rendering 467 can provide areas for the avatars 462-464 to move. As an example, the avatars may move around streets, in and out of buildings, rooms, and other areas and regions that are created in the virtual digital environment. A human user 472 can wear a virtual reality headset 474 to view, hear, and/or otherwise experience the virtual digital environment. Virtual reality headset 474 may be a client device, similar to clients 416.

In embodiments, a particular avatar may be associated with a user. As an example, avatar 462 may be associated with human user 472. Thus, user 472 can control the motion and actions of avatar 462, and interact with the other avatars, 463 and 464. The human user may assume that the avatars 463 and 464 are associated with other human users. However, it is possible that one or more avatars within the virtual digital environment 460 are in fact bots. With disclosed embodiments, the motion of avatars within the virtual digital environment are analyzed, and avatars that move in a manner indicative of a bot can be identified, such as with a label or symbol 477 as indicated on avatar 464, such that human users are alerted that an avatar within the virtual digital environment 460 is a potential bot. In response to the alert of a potential bot, a human user may choose to limit interaction and/or information shared with that bot. Thus, disclosed embodiments can help improve computer security by alerting users about avatars that are potentially bots. Embodiments can include rendering a symbol on an avatar that has a computed probability of being a bot, where the computed probability exceeds a predetermined threshold. As an example, the predetermined threshold can be a number in a range from 0 to 1. As an example, a threshold of 0.7 corresponds to a seventy percent chance that an avatar is a bot, based on avatar motion analysis.

Figure 5:
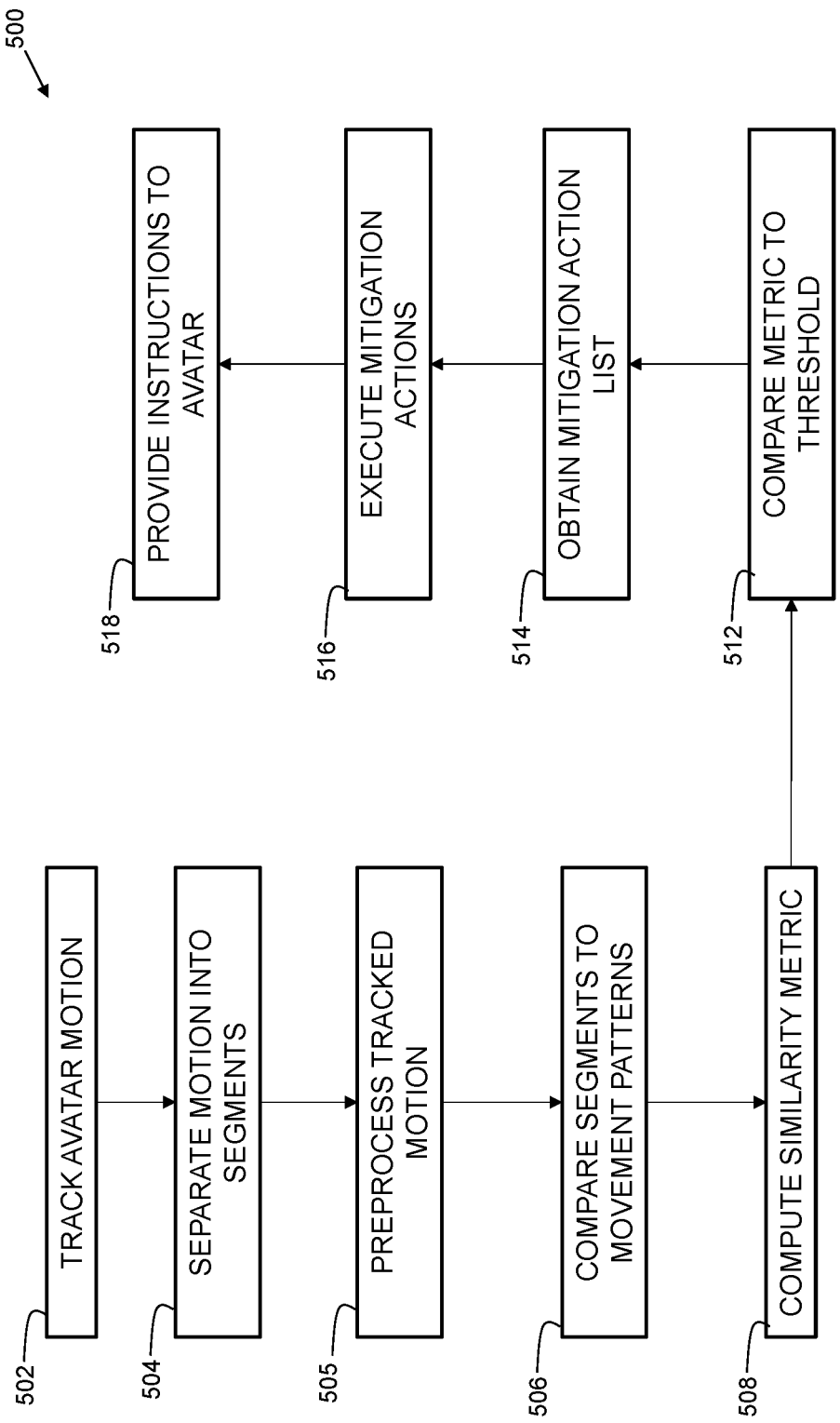
FIG. 5 is a flowchart showing steps for embodiments of the present invention.

FIG. 5 is a flowchart 500 showing steps for embodiments of the present invention. At 502, avatar motion is tracked. The avatar motion can be tracked in one or more dimensions. At 504, the motion is separated into segments. The segments can be linear segments, arcs, and/or other suitable types of segments. At 505 the tracked motion may be preprocessed. The preprocessing can include rotation, scaling, mirroring, and/or other transformations. Thus, embodiments can further include performing preprocessing on the tracked motion prior to the comparing, which occurs at 506. At 506, the segments are compared to movement patterns. Movement patterns can be stored as a sequence of segments. The avatar motion segments can be compared in order and length along with other suitable properties. At 508 a similarity metric is computed, based on how closely the segments from the avatar being analyzed match a particular motion sequence that is indicative of a bot. At 512, the computed metric is compared to a threshold. In response to computing a similarity metric that exceeds a predetermined threshold, a mitigation action list is obtained at 514.

The mitigation action list can include at least one action for the VEBDS 402 to perform. The action can include rendering an indicator on the avatar, such as shown at 477 in FIG. 4. This visually alerts other users that the avatar is potentially a bot. At 516 the mitigation action(s) are executed. The mitigation can include a virtual environment position freeze, which prevents motion of the avatar that is determined to be a potential bot. At 518, instructions are provided to the avatar. The instructions can serve as an authentication challenge. In some embodiments, the virtual environment position freeze is followed by an authentication challenge that is provided to the avatar. If the avatar is in fact controlled by a human user, the human user is able to easily pass the authentication challenge, to remove the virtual environment position freeze. The authentication challenge can be a command to move to a location, and/or other specific instructions. Other mitigations can include a virtual environment account freeze. This prevents the avatar from engaging in the virtual environment with purchases, and/or other interactions. In some embodiments, the mitigation can include deleting the avatar and/or deleting the account. In some embodiments, an authentication challenge is presented before deleting an account or deleting an avatar, and only if the authentication challenge fails, is the mitigation action of deleting an account and/or deleting an avatar performed.

In some embodiments, there can be multiple thresholds and each threshold can have a corresponding action list. As an example, a first threshold can have a value of 0.6, and a second threshold can have a value of 0.9. When the similarity metric computed at 508 exceeds the first threshold, but is less than the second threshold, then the mitigation actions corresponding to the first threshold are executed. In this example, exceeding the first threshold indicates a bot probability of greater than 60 percent, but less than 90 percent, and in that case, the mitigation actions can include issuing an authentication challenge, such as asking the avatar/user to identify an object, move to a location, and/or answer a question. In a case where the similarity metric computed at 508 exceeds the second threshold, indicating a bot probability of greater than 90 percent, then a stronger mitigation action, such as a virtual environment position freeze may be performed. Thus, embodiments can further include a second predetermined threshold, and: in response to the similarity metric exceeding the second predetermined threshold: obtaining a second list of at least one mitigation action; and executing the at least one mitigation action from the second list.

Figure 6:
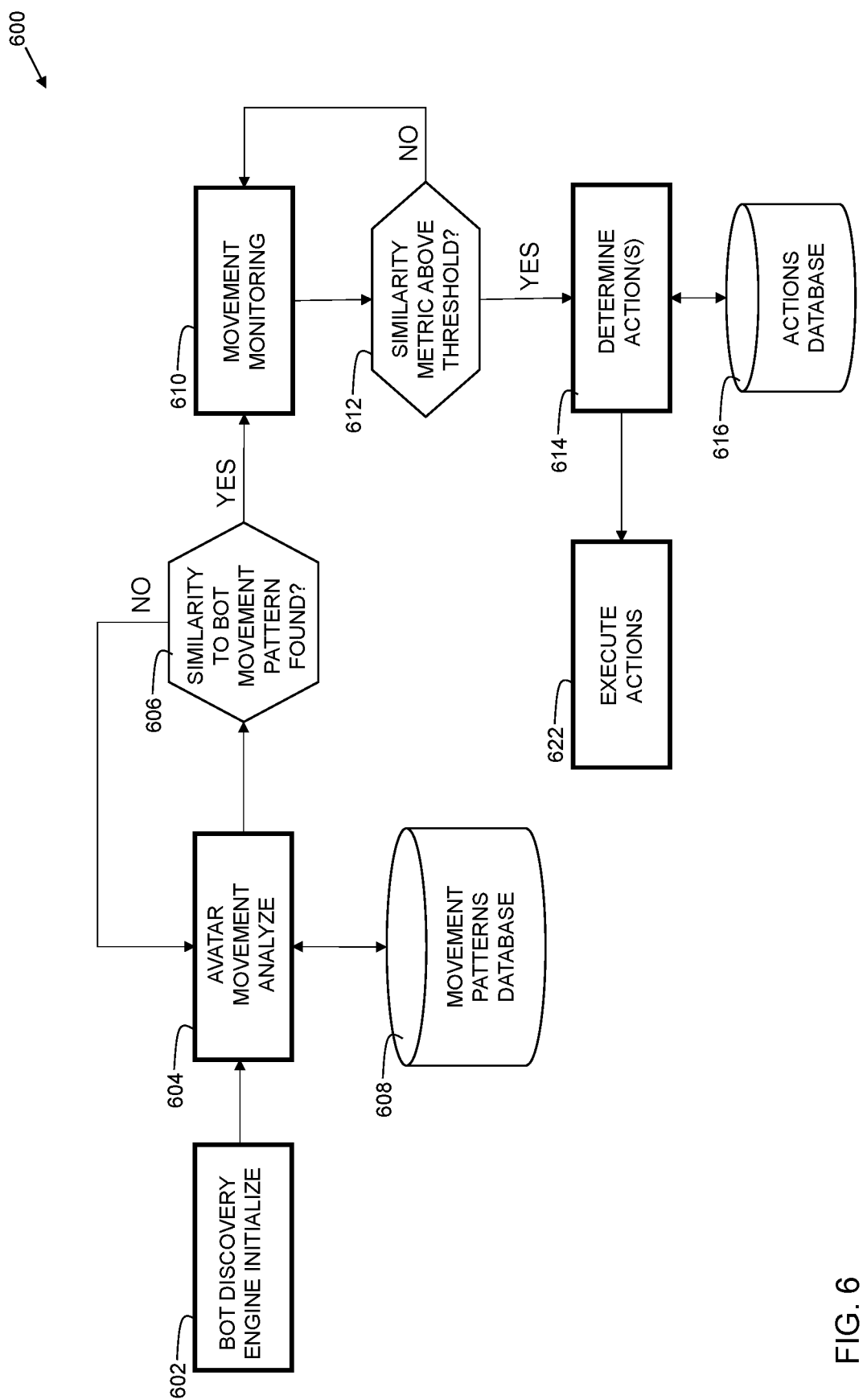
FIG. 6 is a flow diagram showing additional steps for embodiments of the present invention.

FIG. 6 is a flow diagram 600 showing additional steps for embodiments of the present invention. At 602, the bot discovery engine is initialized. The bot discovery engine may be an application, library, or collection of applications and/or libraries that is executed by the VEBDS 402 in order to track motion of avatars in a virtual environment for the purposes of detecting bots. At 604, the movement of avatars is analyzed. This can be accomplished via application programming interface (API) calls that expose the location and/or movement of avatars. In other embodiments, log files may be scraped and/or parsed to determine avatar motion. The tracked motion is compared to movement patterns in movement pattern database 608. The movement pattern database 608 can include movement patterns of known and/or suspected bot avatars, as well as movement patterns of known and/or confirmed human-controlled avatars. At 608, a check is made to determine if a similarity is found to a bot movement pattern. If no at 606, then the process returns to 604 to continue analyzing avatar movement.

If yes at 606, then the movement of the avatar is monitored for additional movement. A similarity metric is computed based on the similarity of avatar movement compared with known bot avatar movements stored in the movement patterns database 608. If the similarity metric exceeds a predetermined threshold, then the process continues to 614 where at least one mitigation actions are determined. This can include retrieving actions from actions database 614. The flow then continues with executing the actions. In embodiments, the actions can include a virtual environment position freeze, a virtual environment account freeze, a deletion of the avatar, and/or other suitable actions. If no at 612, the process continues to 610 where avatar movement is continuously or periodically monitored.

Thus, disclosed embodiments analyze the avatar's navigation pattern based on the virtual environment/metaverse navigation axis. Embodiments can compute a score based on the delta between user navigation and the navigation parameters. The score can increase if repetitive movements are detected (this is indicative of a scripted bot).

Figure 7C:
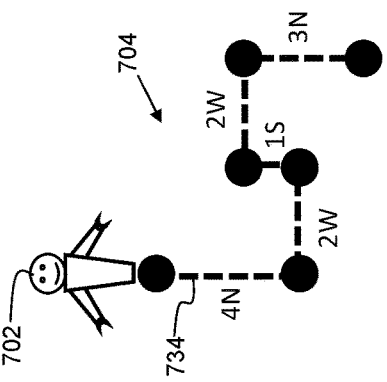
FIG. 7C shows an exemplary avatar motion path after annotation.
Figure 7F:
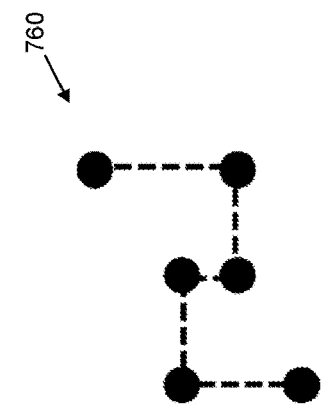
FIG. 7F shows an exemplary avatar motion path after mirroring.
Figure 7B:
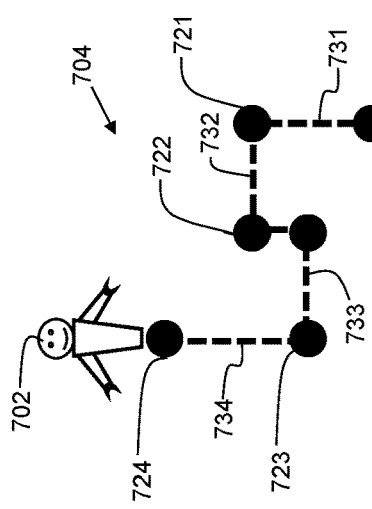
FIG. 7B shows an exemplary avatar motion path after segmentation.
Figure 7E:
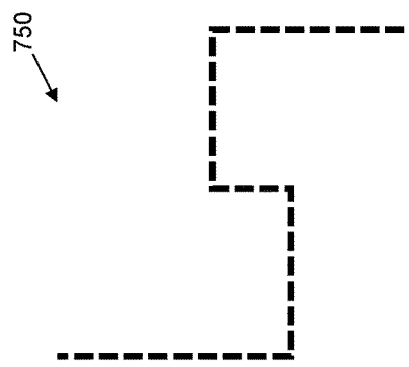
FIG. 7E shows an exemplary avatar motion path after scaling.
Figure 7A:
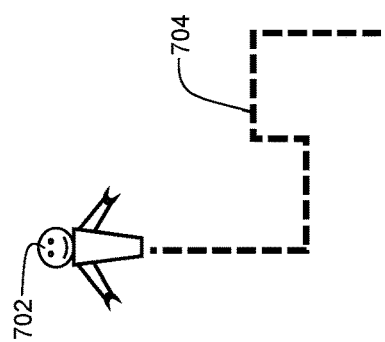
FIG. 7A shows an exemplary avatar motion path.

FIG. 7A shows an exemplary avatar motion path 704 for avatar 702. The motion path 704 comprises a series of movements in various directions. FIG. 7B shows an exemplary avatar motion path after segmentation. In FIG. 7B, the path 704 of FIG. 7A is divided into a polarity of segments and endpoints. Segment 731 is bounded by endpoint 720 and 721. Segment 732 is bounded by endpoint 721 and 722. Segment 733 is bounded by endpoint 722 and 723. Segment 734 is bounded by endpoint 723 and 724. FIG. 7C shows the path 704 of FIG. 7A after annotation. Each segment is annotated with a direction and distance. The annotations can be stored in a file in text, binary, or other suitable format. As an example, segment 734 is annotated with '4N' indicating a direction of 'north' and a distance of 4 units. Embodiments can use Cartesian coordinates, polar coordinates, spherical coordinates, and/or other suitable coordinate systems for recording avatar motion.

Embodiments can include preprocessing of avatar motion paths such as rotation, scaling, and/or mirroring. In embodiments, the preprocessed avatar motion paths are also checked against movement patterns in the movement patterns database 608 (FIG. 6).

Figure 7D:
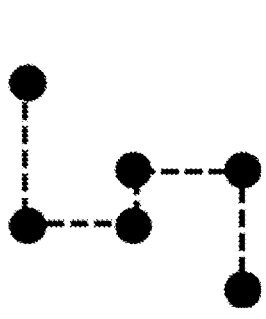
FIG. 7D shows an exemplary avatar motion path after rotation.

FIG. 7D shows an exemplary avatar motion path 740 after rotation. The avatar motion path 740 is the avatar motion path 704 of FIG. 7A, rotated 90 degrees Clockwise. FIG. 7E shows an exemplary avatar motion path 750 after scaling. The avatar motion path 750 is the avatar motion path 704 of FIG. 7A, scaled to be a predetermined percentage larger. FIG. 7F shows an exemplary avatar motion path 760 after mirroring. The avatar motion path 760 is the avatar motion path 704 of FIG. 7A, flipped around its vertical axis. Other preprocessing operations are possible in disclosed embodiments.

In embodiments, comparison between avatar motion and stored movement patterns in the movement patterns database 608 can include computing the number of matching direction changes, distances, and/or other attributes amongst the movement patterns. A score can be computed based on the number of segments that match in direction and/or distance between an avatar motion path (and/or preprocessed motion path), and stored movement patterns in the movement patterns database 608.

Figure 8A:
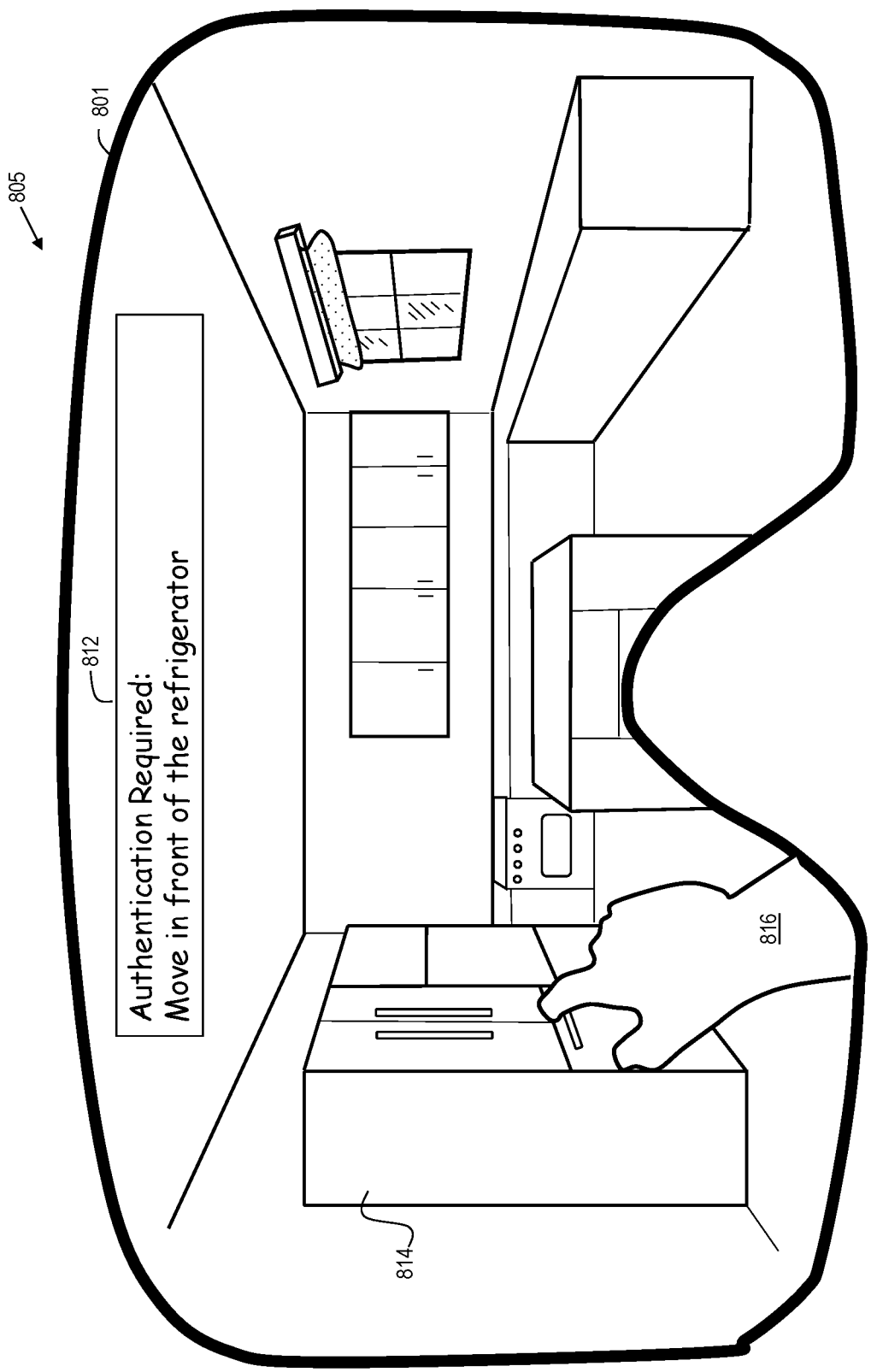
FIG. 8A shows an example virtual reality view with a motion-based authentication message.

FIG. 8A shows an example 805 of a virtual reality view 801 with a motion-based authentication message. In the example 805, the virtual reality view is of a kitchen, that includes a refrigerator 814. In embodiments, the user may use a virtual hand, shown as 816, to indicate a location to move to. In embodiments, the virtual hand may be implemented via the user wearing a glove, holding a controller, image analysis from a front-facing camera of a virtual reality headset, and/or other suitable techniques. In the event that an avatar is suspected of being a bot, based on motion analysis, then an authentication message 812 may be displayed, which includes instructions. If the avatar is controlled by a human user, the human user may follow the instructions. Upon successful completion of the instructions, the avatar status can be changed from suspected bot to confirmed human user, and updated accordingly in the account database (441 of FIG. 4). In embodiments, the at least one mitigation action includes providing instructions to the avatar. In embodiments, the instructions include text and/or audio. The audio can include speech that asks a user to perform an action. In embodiments, the instructions include an instruction for the avatar to move to a specified location.

Figure 8B:
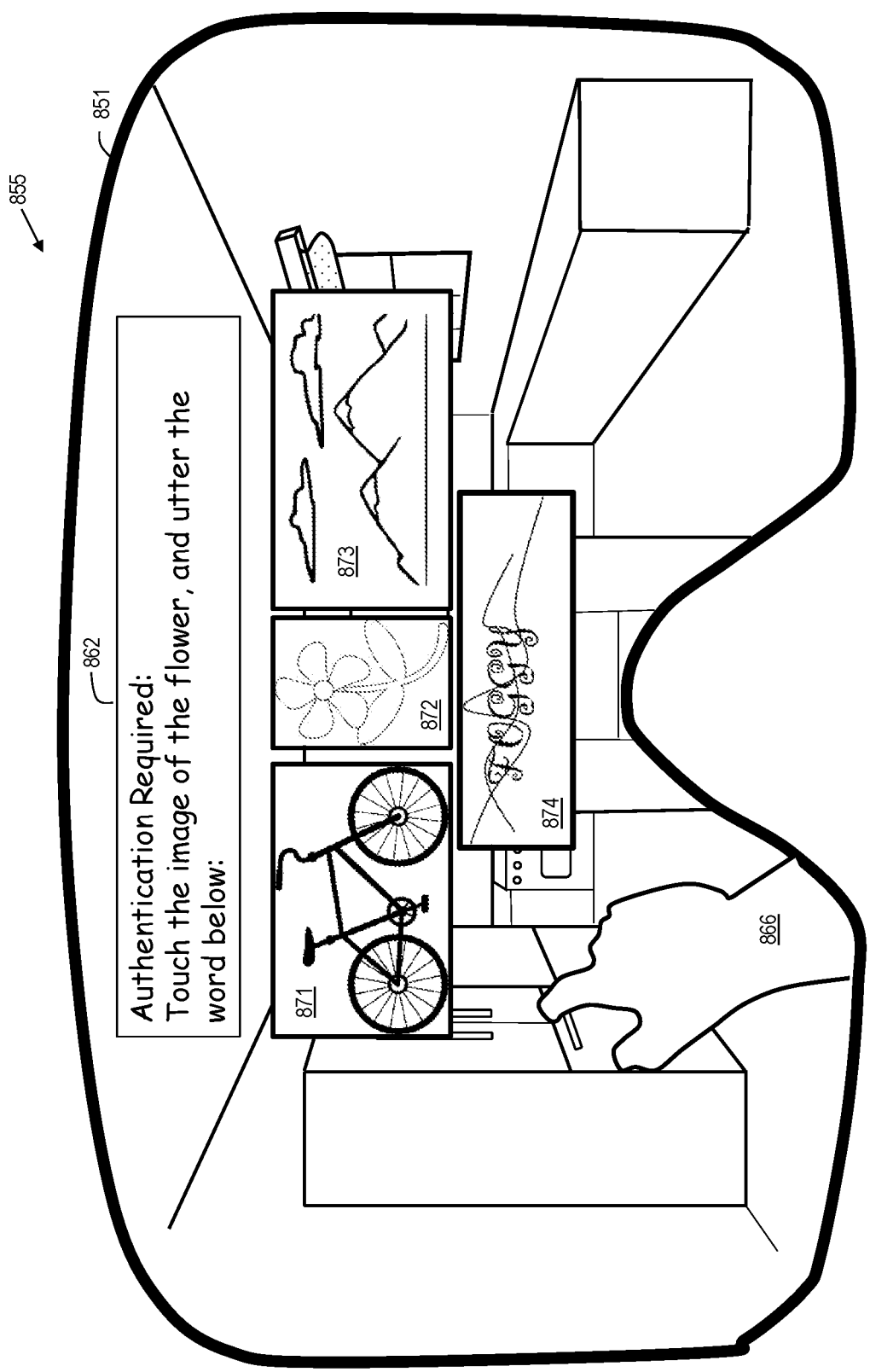
FIG. 8B shows an example virtual reality view with a puzzle-based authentication message.

FIG. 8B shows an example 855 of a virtual reality view 851 with a puzzle-based authentication message. In the example 855, an authentication message 862 provides instructions for a puzzle-based challenge. In the example, three images, indicated as 871, 872, and 873 are shown. Image 871 is of a bicycle, image 872 is of a flower, and image 873 is of mountains. Additionally, image 874 is an image of a word ("Foggy") with lines through it to help obfuscate it from optical character recognition, while still allowing a human to read it. The instructions in authentication message 862 instruct the user to touch the image of the flower, and then utter the word "foggy" as shown in 874. Thus, in embodiments, the instructions include an instruction for an utterance. In embodiments, the user may use a virtual hand, shown as 866, to touch (select) an image by holding his/her virtual hand over the image for a predetermined duration (e.g., three seconds). In embodiments, the virtual hand may be implemented via the user wearing a glove, holding a controller, image analysis from a front-facing camera of a virtual reality headset, and/or other suitable techniques. In the event that an avatar is suspected of being a bot, based on motion analysis, then an authentication message 862 may be displayed, which includes instructions. If the avatar is controlled by a human user, the human user may follow the instructions. Upon successful completion of the instructions, the avatar status can be changed from suspected bot to confirmed human user, and updated accordingly in the account database (441 of FIG. 4).

Figure 9:
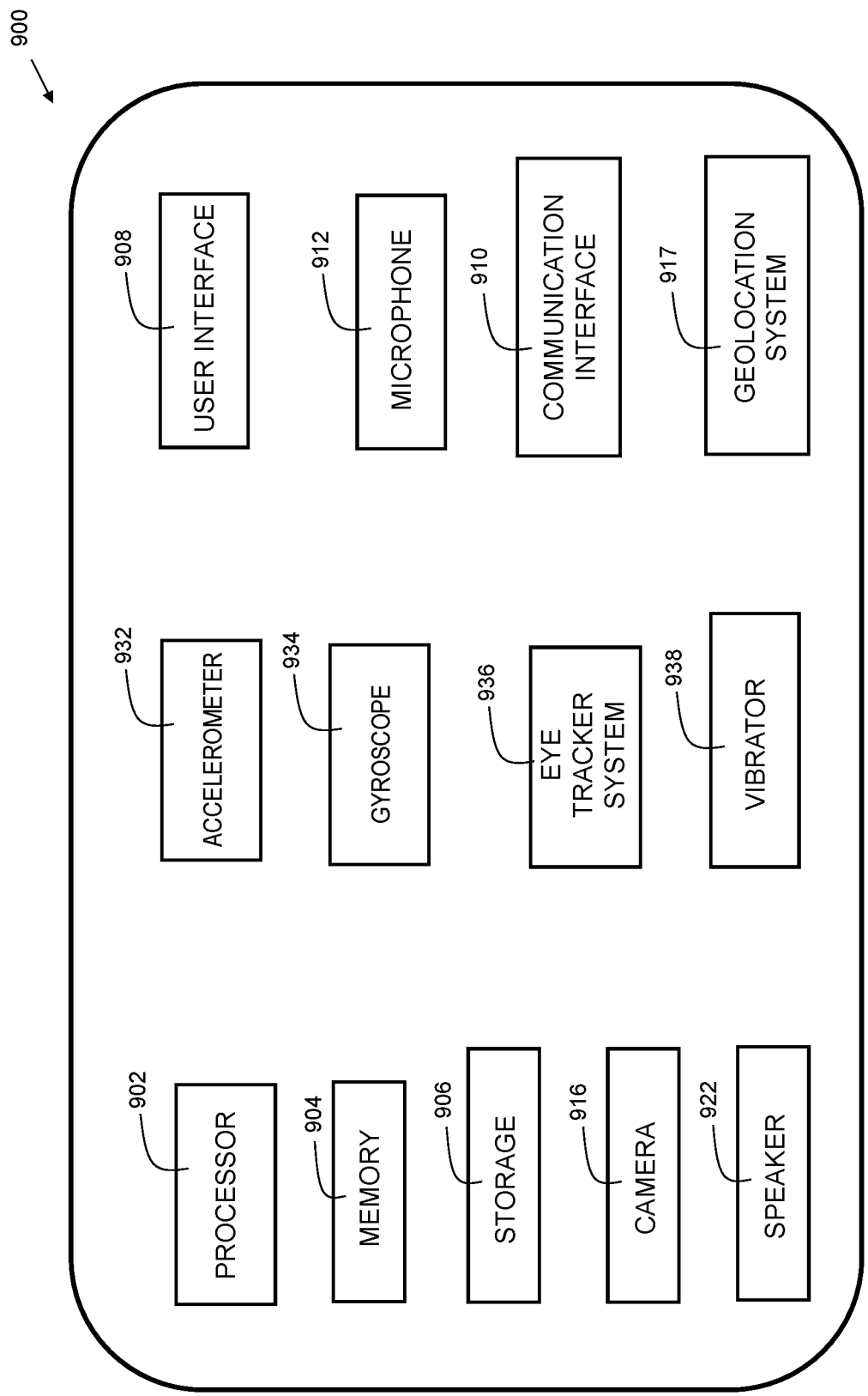
FIG. 9 shows a block diagram of a client device in accordance with embodiments of the present invention.

FIG. 9 shows a block diagram of a client device 900 in accordance with disclosed embodiments. In embodiments, this may represent a virtual reality headset such as 474 of FIG. 4. Device 900 includes a processor 902, which is coupled to a memory 904, which can include random-access memory (SRAM), magnetic storage, and/or a read only memory such as flash, EEPROM, optical storage, and/or other suitable memory. In some embodiments, the memory 904 may not be a transitory signal per se.

Device 900 may further include storage 906. In embodiments, storage 906 may include at least one magnetic storage devices such as hard disk drives (HDDs). Storage 906 may additionally include at least one solid state drives (SSDs).

Device 900 may, in some embodiments, include a user interface 908. This may include a display, keyboard, or other suitable interface. In some embodiments, the display may be touch-sensitive.

The device 900 further includes a communication interface 910. The communication interface 910 may include a wireless communication interface that includes modulators, demodulators, and antennas for a variety of wireless protocols including, but not limited to, Bluetooth™, Wi-Fi, and/or cellular communication protocols for communication over a computer network and/or operation with a gaming system, and/or other computers and/or computer peripherals for supporting virtual environments and/or metaverses. In embodiments, instructions are stored in memory 904. The instructions, when executed by the processor 902, cause the electronic computing device 900 to execute operations in accordance with disclosed embodiments.

Device 900 may further include a microphone 912 used to receive audio input. The audio input may include speech utterances. The audio input may be digitized by circuitry within the device 900. The digitized audio data may be analyzed for phonemes and converted to text for further natural language processing. In some embodiments, the natural language processing may be performed onboard the device 900. In other embodiments, all or some of the natural language processing may be performed on a remote computer.

Device 900 may further include camera 916. In embodiments, camera 916 may be used to acquire still images and/or video images by device 900. Device 900 may further include one or more speakers 922. In embodiments, speakers 922 may include stereo headphone speakers, and/or other speakers arranged to provide an immersive sound experience. Device 900 may further include geolocation system 917. In embodiments, geolocation system 917 includes a Global Positioning System (GPS), GLONASS, Galileo, or other suitable satellite navigation system.

Device 900 may further include an accelerometer 932 and/or gyroscope 934. The accelerometer 932 and/or gyroscope 934 may be configured and disposed to track movements of a user, such as head and/or hand movements while donning wearable computing devices such as virtual reality headsets and/or handheld remote-control devices in communication with a virtual reality system.

Device 900 may further include an eye tracker system 936. The eye tracker system 936 may include one or more cameras configured and disposed to track eye movement of a user, and render portions of a virtual environment based on eye movement. Device 900 may further include a vibrator 938 which may be used to provide tactile alerts to a user about suspected bot activity. As an example, disclosed embodiments may issue a tactile alert such as a vibration in response to detecting potential/suspected bot avatars within a field of view and/or proximity to a user avatar within a virtual environment. The components shown in FIG. 9 are exemplary, and other devices may include more, fewer, and/or different components than those depicted in FIG. 9.

As can now be appreciated, disclosed embodiments provide techniques for automatic detection and mitigation of bot avatars in a virtual environment such as a metaverse. Thus, disclosed embodiments improve computer security, as well as improve the utilization of computer resources by preventing the wasting of computer resources on nuisance and/or malicious bot avatar activities, thereby making these systems and platforms safer and more enjoyable for legitimate users.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for bot detection, comprising:
    tracking motion of an avatar within a virtual environment;
    separating the tracked motion into a plurality of movement segments;
    comparing the plurality of movement segments to a collection of movement patterns;
    computing a similarity metric for the tracked motion to at least one movement pattern from the collection of movement patterns;
    in response to the similarity metric exceeding a predetermined threshold for being a bot:
        obtaining a list of at least one mitigation action; and
        executing the at least one mitigation action from the list includes providing instructions to the avatar, wherein the at least one mitigation action includes displaying a label that the avatar is a potential bot in the virtual environment, wherein the instructions include requiring the avatar to move to a specified location in the virtual environment and requiring the avatar to input an utterance in the virtual environment.

2. The method of claim 1, further comprising a second predetermined threshold, and:
    in response to the similarity metric exceeding the second predetermined threshold:
    obtaining a second list of at least one mitigation action; and
    executing the at least one mitigation action from the second list.

3. The method of claim 1, further comprising performing preprocessing on the tracked motion prior to the comparing.

4. The method of claim 3, wherein the preprocessing includes rotation and mirroring.

5. The method of claim 1, wherein the similarity metric is increased when repetitive movements are detected for the avatar.

6. The method of claim 3, wherein the preprocessing includes scaling.

7. The method of claim 1, wherein the at least one mitigation action includes providing instructions to the avatar.

8. The method of claim 7, wherein the instructions include text.

9. The method of claim 7, wherein the instructions include requiring the avatar to input audio in the virtual environment.

10. The method of claim 1, wherein the label displayed for the avatar comprises displaying a probability of being the potential bot in the virtual environment in response to the similarity metric exceeding the predetermined threshold for being the bot.

11. The method of claim 1, wherein the mitigation actions include a virtual environment position freeze in the virtual environment.

12. The method of claim 1, wherein the mitigation actions include a virtual environment account freeze.

13. The method of claim 1, wherein the mitigation actions include deletion of the avatar.

14. An electronic computation device comprising:
a processor;
a memory coupled to the processor, the memory containing instructions, that when executed by the processor, cause the electronic computation device to:
track motion of an avatar within a virtual environment;
separate the tracked motion into a plurality of movement segments;
compare the plurality of movement segments to a collection of movement patterns;
compute a similarity metric for the tracked motion to at least one movement pattern from the collection of movement patterns;
in response to the similarity metric exceeding a predetermined threshold for being a bot:
obtain a list of at least one mitigation action; and
execute the at least one mitigation action from the list includes providing instructions to the avatar, wherein the at least one mitigation action includes displaying a label that the avatar is a potential bot in the virtual environment, wherein the instructions include requiring the avatar to move to a specified location in the virtual environment and requiring the avatar to input an utterance in the virtual environment.

15. The electronic computation device of claim 14, wherein the memory further comprises instructions, that when executed by the processor, cause the electronic computation device to perform preprocessing on the tracked motion prior to the comparing.

16. The electronic computation device of claim 14, wherein the memory further comprises instructions, that when executed by the processor, cause the electronic computation device to delete the avatar.

17. The electronic computation device of claim 14, wherein the memory further comprises instructions, that when executed by the processor, cause the electronic computation device to provide instructions for the avatar to move to a specified location.

18. A computer program product for an electronic computation device comprising a computer readable storage medium having program instructions embodied therewith, the program instructions executable by a processor to cause the electronic computation device to:
track motion of an avatar within a virtual environment;
separate the tracked motion into a plurality of movement segments;
compare the plurality of movement segments to a collection of movement patterns;
compute a similarity metric for the tracked motion to at least one movement patter from the collection of movement patterns;
in response to the similarity metric exceeding a predetermined threshold for being a bot:
obtain a list of at least one mitigation action; and
execute the at least one mitigation action from the list includes providing instructions to the avatar, wherein the at least one mitigation action includes displaying a label that the avatar is a potential bot in the virtual environment, wherein the instructions include requiring the avatar to move to a specified location in the virtual environment and requiring the avatar to input an utterance in the virtual environment.

19. The computer program product of claim 18, wherein the computer readable storage medium includes program instructions executable by the processor to cause the electronic computation device to delete the avatar.

* * * * *